United States Patent [19]
Womer et al.

[11] Patent Number: 5,798,077
[45] Date of Patent: Aug. 25, 1998

[54] SCREW FOR PLASTICATING APPARATUS AND METHOD OF USE

[75] Inventors: Timothy W. Womer, Edinburg; Paul N. Colby; Harry F. White, both of New Castle, all of Pa.

[73] Assignee: Spirex Corporation, Youngstown, Ohio

[21] Appl. No.: 743,542

[22] Filed: Nov. 4, 1996

[51] Int. Cl.⁶ .................. B29C 47/38; B29C 47/64
[52] U.S. Cl. .............. 264/349; 264/176.1; 264/211.21; 425/206; 425/208; 425/376.1
[58] Field of Search .................. 264/349, 211.21, 264/176.1; 425/205–209, 376.1

[56] References Cited

U.S. PATENT DOCUMENTS

| | | | |
|---|---|---|---|
| 3,375,549 | 4/1968 | Geyer | 425/376.1 |
| 3,486,192 | 12/1969 | Le Roy | 425/376.1 |
| 3,788,612 | 1/1974 | Dray . | |
| 4,092,015 | 5/1978 | Koch | 425/209 |
| 4,215,978 | 8/1980 | Takayama et al. . | |
| 4,227,870 | 10/1980 | Kim . | |
| 4,277,182 | 7/1981 | Kruder . | |
| 4,405,239 | 9/1983 | Chung et al. . | |
| 4,444,507 | 4/1984 | Dray . | |
| 4,723,847 | 2/1988 | Dray . | |
| 4,752,136 | 6/1988 | Colby . | |
| 4,842,414 | 6/1989 | Dray . | |
| 4,896,969 | 1/1990 | Dray . | |
| 4,908,169 | 3/1990 | Galic et al. | 264/40.6 |
| 4,925,313 | 5/1990 | Nunn | 366/81 |
| 4,944,906 | 7/1990 | Colby et al. | 425/208 |
| 5,071,256 | 12/1991 | Smith et al. | 366/89 |
| 5,215,764 | 6/1993 | Davis et al. . | |
| 5,439,633 | 8/1995 | Durina et al. | 425/208 |
| 5,599,097 | 2/1997 | Christie | 366/88 |

FOREIGN PATENT DOCUMENTS

| | | | |
|---|---|---|---|
| 2615978 | 10/1976 | Germany | 425/208 |
| 300473 | 6/1992 | Germany | 264/211.21 |
| 53-86757 | 7/1978 | Japan | 425/376.1 |

*Primary Examiner*—Jan H. Silbaugh
*Assistant Examiner*—Mark Eashoo
*Attorney, Agent, or Firm*—Robert J. Herberger, Esquire

[57] ABSTRACT

A plasticating screw and method of plasticating without thermal degradation problems. Said screw having a metering section with a helical flight disposed within and cooperating with the innerwall of a heated barrel. In particular, solid resinous material is introduced to a helical valley extending between said flight. The resinous material is heated and plasticized by said apparatus while being advanced along a helical path towards an outlet opening by the rotation of said screw. The bottom surface of the helical valley in said metering section having a plurality of geometrically shaped surfaces in side-by-side relation with at least two of said shaped surfaces being sloped. During operation, the level differential between the shaped surfaces induces a continuous tumbling, variable shear and mixing action upon the molten resin as the molten resin in the metering section flows along the helical path.

17 Claims, 3 Drawing Sheets

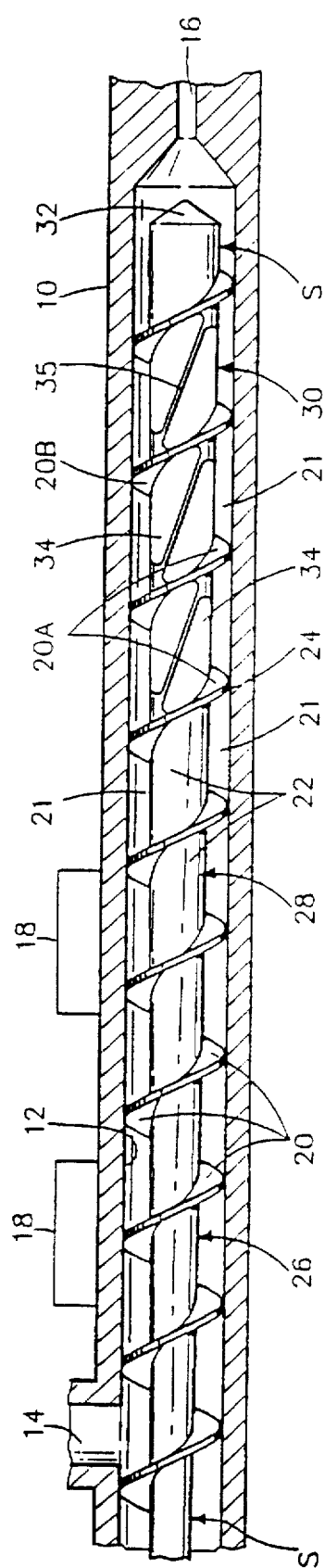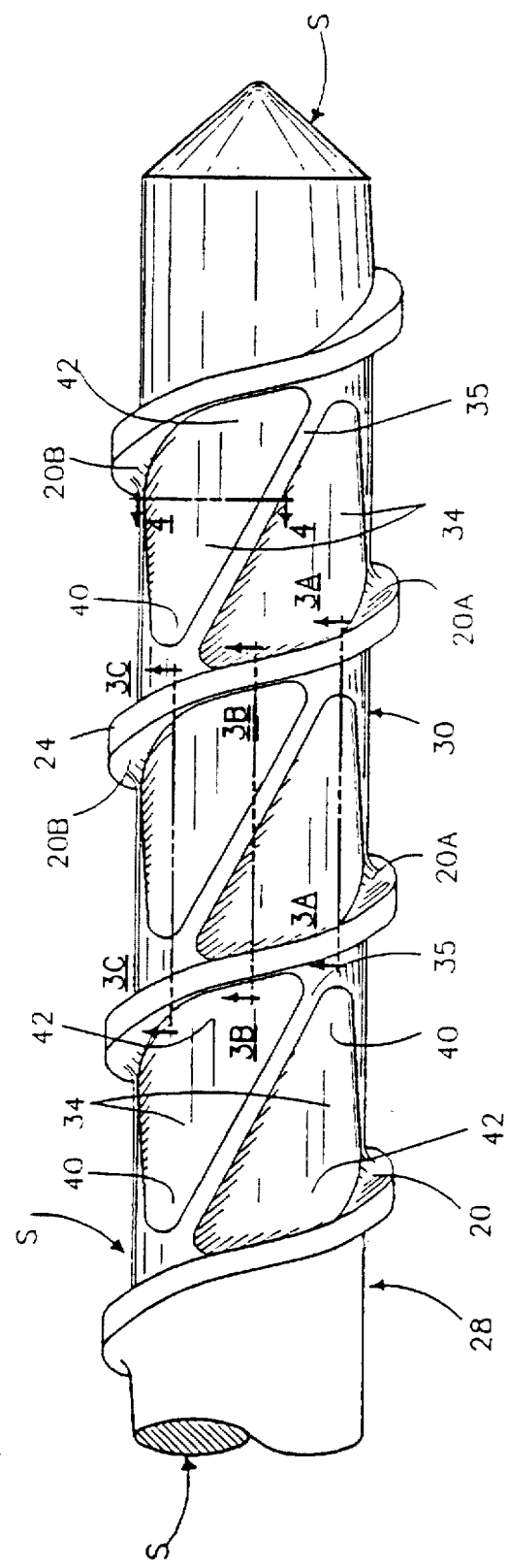
FIG. 1
FIG. 2

SCREW FOR PLASTICATING APPARATUS AND METHOD OF USE

FIELD OF INVENTION

This invention relates to extruders and/or injection machines of the type in which a screw rotatable within a barrel is employed to extrude or inject molten resinous material to the outlet opening of the extruder barrel. More specifically, this invention is concerned with the thorough mixing and melting of resinous material in the metering section of the screw by having a plurality of geometrically shaped surfaces arranged side-by-side along a helical path.

BACKGROUND OF THE INVENTION

Plasticating extruders and injection machines (hereinafter collectively referred to as an "extruder") commonly used today are of the type which receive polymer pellets or powders, heat and work the polymer to convert it into a melted or molten state before delivering the molten polymer under pressure through a restricted outlet or discharge opening. Although there are several different types of plastic polymers each having different physical properties, it is desirable that the extrudate leaving the extruder be fully melted, homogeneously mixed and uniform in temperature, viscosity, color and composition.

The extruder apparatus includes an elongated cylindrical barrel which may be heated at various locations along its' length. A screw which is rotatable about its' axis extends longitudinally through the barrel. Screws are generally made milling tools and cutters making the periphery of the screw rounded or cylindrical. The screw has a core with a helical flight thereon and the flight cooperates with the cylindrical inner surface of the barrel to define a helical valley for passage of the resin to the extruder outlet opening.

Although there are different screw configurations for different polymer compositions, the typical extruder screw ordinarily has at least three sections along its extended axis with each section being designed for a particular function. Ordinarily, there is a feed section, a transition section and a metering section in series along the length of the screw. The feed section extends beneath and forward from a feed opening where a polymer in pellet or powder form is introduced into the extruder to be carried forward along the inside of the barrel. The depth of the helical valley of the screw in the feed section is usually large enough to overfeed the solid polymer. The overfeeding action serves to compact and pressurize the polymer particles as the solid bed of material advances in the extruder.

The material is then worked and heated in the transition section so that the polymer melts as it is forced forward along the screw toward the metering section. Most of the melting occurs in the transition section. At the start of the transition section melting occurs near the barrel surface forming a thin melt film with a solid bed of polymer thereunder. As disclosed in U.S. Pat. No. 4,752,136, the general advancing pattern persists until a substantial portion of the polymer reaches the molten state.

From the transition section material passes to the metering section which generally has a shallower helical valley. As one of its' intended functions, the metering section provides a constant flow of molten polymer toward the outlet opening. In addition, the metering section must melt any unmelted solids and mix the molten polymer into a homogeneous and uniform composite. The resin is then forced through the outlet opening either by the continued rotation of the extruder screw or by an injection stroke forward of an injection screw.

The shallow screw channel in the metering section increases the shear and friction in the polymer which has a tendency to raise the temperature of the polymer. The temperature rise may cause thermal degradation of the molten polymer unless mixing is induced. Therefore, it is important to increase the mixing action of the molten polymer to keep the material from stratifying. Some screw designs enhance mixing by providing a secondary flight of which U.S. Pat. No. 3,788,614 to Gregory, U.S. Pat. No. 3,941,535 to Street and U.S. Pat. No. 4,752,136 to Colby are notable examples. Others, increase agitation by using protrusions and grooves such as U.S. Pat. No. 4,444,507 to Dray. Still other inventions divert the flow of material from the helical path or channel to a mixing element which interrupts the helical flight as shown in U.S. Pat. Nos. 3,788,612 and 4,842,414 to Dray and U.S. Pat. No. 3,486,192 to G. LeRoy.

Although these configurations satisfy some of the general needs, many polymer composites are heat sensitive. The LeRoy design has dead pockets at the end of each inlet and outlet channel. Molten polymer may be trapped in the pockets exposing the polymer to excessive heating over time which may cause degradation. In like fashion, configurations that include inlet and outlet grooves or channels arranged in a helical manner, as described by the Gregory and Dray designs, also have dead spots. In the Gregory design, the inlet channels have closed ends to force the melt to flow over the adjacent land into the outlet channel. Like the LeRoy design, the closed ends of the inlet channels form dead spots which are not conducive to producing isothermal melt quality.

It is therefore an objective of this invention to provide a screw having a metering section capable of providing effective and efficient mixing without stagnation or dead spots. Another objection of this invention is to provide dispersive and distributive mixing of satisfactorily high and uniform levels.

SUMMARY OF THE INVENTION

This invention is directed to a screw configuration and method of using said screw configuration. It accomplishes several objectives, including the improved mixing and melting of resin material in the metering section for both plastic extrusion and injection screws. This invention incorporates geometrical shapes or surfaces in the core of the screw's metering section.

Typically, the screw's core or periphery has a cylindrical shape. With this invention, a plurality of geometrically shaped surfaces are formed on the bottom core of the helical valley in the metering section using a 4-axis CNC (computer numerical control) thread grinding machine having a wheel with an angular grinding face. For purposes of this invention, term "geometrically shaped surface" shall be used to identify each of the plurality of surfaces extending side-by-side in the bottom core of the helical valley. Each geometrically shaped surface may have a unique shape (i.e. rectangle or trapezoid) although a triangular shape is preferred.

Between each pair of geometrically shaped surfaces is a barrier land. The barrier land is a shallow depth area. At least two of the geometrical surfaces are sloped in comparison with the cylindrical inner surface of the barrel such that the sloped geometrically shaped surfaces either gently rise up or slope down along the length of the screw. If the slope geometrically shaped surfaces are adjacent, the slopes alternate. For example, the first geometrically shaped surface in any given pair slopes from shallow-to-deep while the second geometrically shaped surface slopes in the opposite direction from deep-to-shallow.

In terms of the plasticating method, the present invention relates to plasticating resinous material in a molten state under pressure by feeding resin in a solid state to the feed section of a screw extruder. As the screw is rotated in the cylindrical barrel, the flight of the screw and the inner surface of the barrel cooperate to move resin material along a helical path to the transition section. In the transition section, heat is applied to the barrel which transfers to the material while working it between the barrel and the screw. As a result, a majority of the material is converted into a molten state.

The flow of material is then passed to the metering section which is shallower than the transition section. The metering section having a helical valley defined by the helical flight. As previously stated, the bottom surface of the valley in the metering section of this invention is defined by a plurality of geometrically shaped surfaces extending side-by-side along the helical path. Some or all the surfaces do not have uniform depths such that the surfaces either gently rise up or slope down along the length of the screw. The slope of adjacent surfaces typically alternate from shallow-to-deep to deep-to-shallow. Between each pair of geometrically shaped surfaces is a barrier land.

As the molten material is advanced by the helical flight, the barrier lands and geometrically shaped surfaces create chaotic, distributive and dispersive mixing upon the resin to assure complete melting and breakdown of agglomerates. The alternating slopes accomplishes a pumping action, streamlining the melt forward through the mixing section with a minimum pressure drop and without dead spots where melt has a tendency to thermally degrade. This invention also tends to avoid temperature and viscosity differentials in the flowing resin.

These and other advantages will be more readily apparent by reference to the attached drawings and description of the preferred embodiment.

BRIEF DESCRIPTION OF THE DRAWINGS

FIG. 1 shows a cross section of a plasticating apparatus having a screw;

FIG. 2 shows an enlarged view of the metering section of the screw of FIG. 1;

DESCRIPTION OF THE PREFERRED EMBODIMENT

Figure 3A:
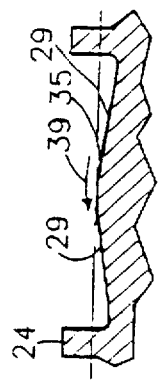
FIGS. 3A, 3B and 3C shows three consecutive cross-sectional views taken through the metering section of FIG. 2.
Figure 3C:
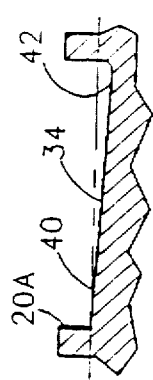
Figure 3B:
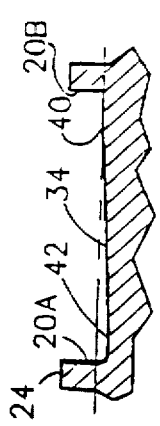

Referring to FIG. 1, a plasticating apparatus can be seen including a cylindrical barrel 10 having a cylindrical inner lining surface 12. Generally, the barrel 10 is provided with inlet opening 14 for the admission of one or more solid particulate resins and any required additives or agents. A heating means 18 is provided to the barrel 10. The barrel 10 is also provided with a discharge opening 16 for the discharge of molten extrudate. A discharge cone or valve 32 is employed at the downstream end of the screw S just prior to the discharge opening 16 to help control the discharge of molten resin from the apparatus.

Within the barrel 10 is a screw S which is rotated by means not shown. The screw S includes a single continuous helical flight 20 winding around a core 22. The flight 20 includes flight land 24 which moves in close proximity to inner surface 12 of the barrel 10. The axial distance between comparable points on the adjacent flights represents the pitch of the flight.

Flight 20 has a front and back wall, 20A and 20B respectively. Between walls 20A and 20B is a helical valley 21 bound by inner surface 12 of the barrel 10, as best seen in FIG. 1. The bottom of the helical valley 21 is the screw core 22. The lateral distance between the flight land 24 and the core 22 is often referred to as the channel depth of the helical valley 21. As previously stated, the channel depth of the helical valley 21 varies along the axial distance of the screw S. The screw S has a relatively deep channel depth in the feed section 26 to allow for the admission, heating and working of solid resinous materials. However, forward from the feed section 26 is a transition section 28 which has a reduced channel depth in comparison to the channel depth of the feed section 26. The reduced channel depth in the transition section 28 accommodates the decreased volume of resinous material caused by the elimination of air during melting.

Forward from the transition section 28 is the metering section 30. The metering section 30 has a relatively shallower channel depth on average in comparison to the transition section 28. However, in this invention the channel depth in the metering section 30 various.

Figure 4:
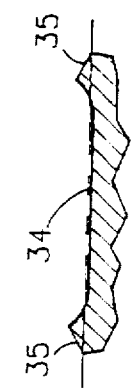
FIG. 4 shows a partial cross sectional view taken through FIG. 2 at approximately 90° angle to FIG. 3A viewing the convex top periphery of the geometrically shaped surface, while alternatively
Figure 4A:
FIGS. 4A and 4B show a concave and substantially planar top periphery, respectively.
Figure 4B:

Referring to FIGS. 2, 3A, 3B, 3C and FIGS. 4, 4A and 4B, the surface of the core 22 of the helical valley 21 in the metering section 30 includes a plurality of geometrically shaped surfaces 34 extending in side-by-side relationship. The preferred shape of surfaces 34 is triangular having a slightly convex periphery. However, as an alternative the top periphery of the geometrically shaped surfaces 34 may be planar or concave as seen in FIGS. 4A and 4B. Further, the shape of each surface 34 may differ, i.e. the shaped surfaces may be rectangular or trapezoidal. Between each adjacent pair of geometrically shaped surfaces 34 is a barrier land 35 traversing the helical valley.

Figure 5:
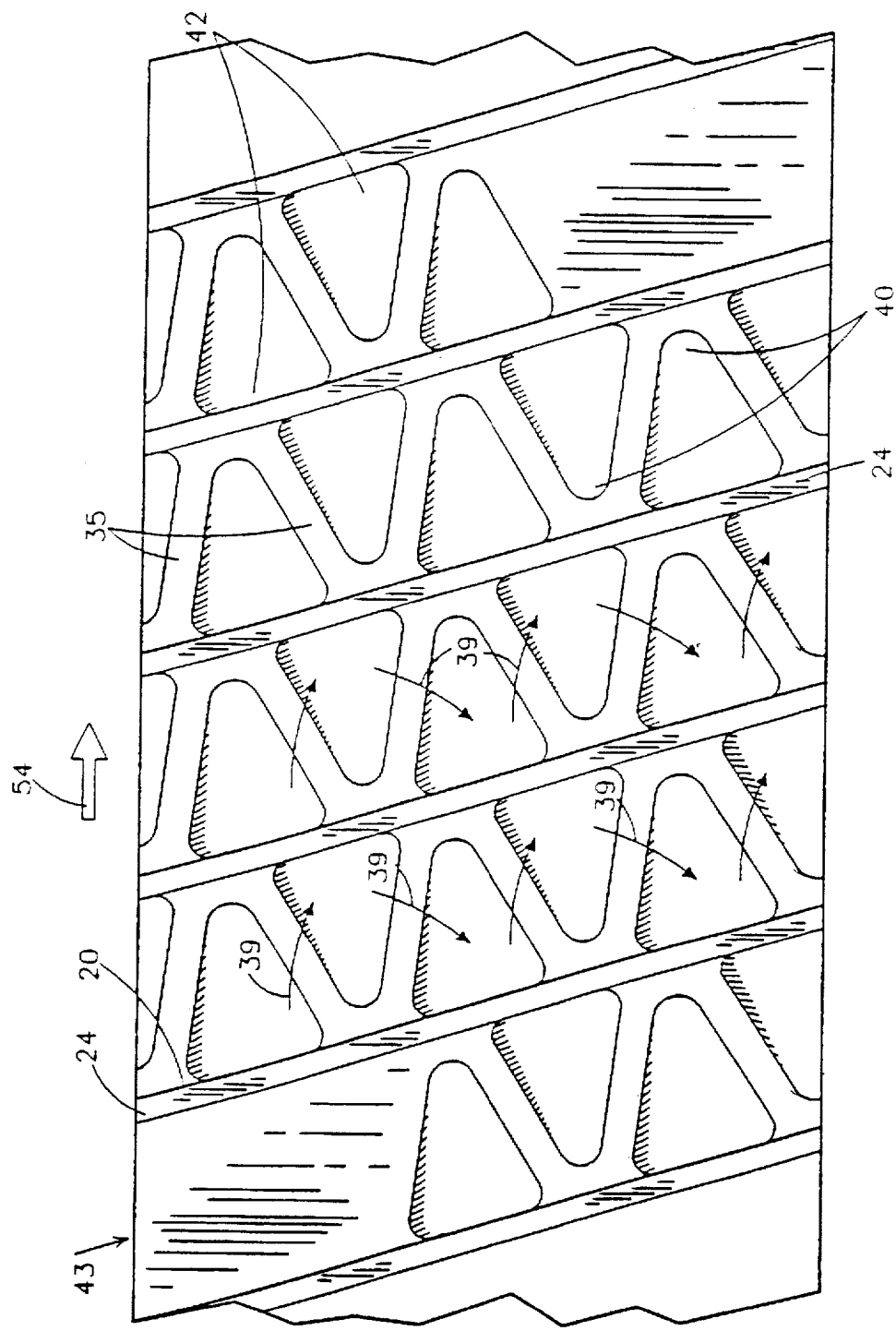
FIG. 5 illustrates the mixing action occurring in the metering section, and more specifically the tumbling and mixing action occurring between adjacent geometrically shaped surfaces and intersecting barrier lands along the helical path.

Using the preferred embodiment, the plurality of triangular shaped surfaces 34 are arranged in the core 22 of the helical valley 22 between walls 20A and 20B of helical flight 20 so that every other geometrically shaped surface 34 has a side of its' triangular shape parallel with wall 20A, and the immediately adjacent geometrically shaped surface 34 has a side of its' triangular shape parallel with wall 20B. As a result, the geometrically shaped surfaces 34 are arranged in an alternating pattern throughout the helical path, as best seen in FIG. 5.

Although some or all of the geometrically shaped surfaces 34 may have a uniform depth, in the preferred embodiment (as shown in FIGS. 2, 3A, 3B and 3C) the geometrically shaped surfaces either gently rise up or slope down toward the axis of the screw S between corresponding walls 20A and 20B in the helical valley 21. The slopes of the geometrically shaped surfaces 34 alternate from shallow-to-deep to deep-to-shallow along the helical path.

The channel depth of each geometrically shaped surface 34 may be tailored in relation to the channel depth of its' corresponding barrier land 35 to provide sufficient shear for different resin materials. However, in this invention the optimum channel depth of the deep portion 42 of each geometrically shaped surface 34 is between the range of about 0.125 to 0.175 inches with the preferred channel depth at about 0.150 inches for a 2.5 inch diameter screw. The optimum channel depth of the shallow portion 40 is between the range of about 0.050 to 0.100 inches with the preferred depth at about 0.075 inches for the same diameter screw. The barrier land 35 has a channel depth substantially equivalent to shallow portion 40. These depths would be scaled up or down depending on the screw diameter and resin being processed 10 using the standard method of design known in the art.

The deep portion 42 of each triangular surface 34 is along the side of the triangle directly parallel to either flight wall 20A or 20B depending upon whether the geometrically shaped surface 34 is sloping from shallow-to-deep or deep-to-shallow relative to the direction of the helical path. The shallow portion 40 is directly opposite the deep portion 42 and adjacent to the opposite flight wall in the helical valley 21. For example, if the geometrically shaped surface 34 is sloping from deep-to-shallow, the deep portion 42 would be adjacent to flight wall 20A and the shallow portion 40 would be adjacent to flight wall 20B.

In each geometrically shaped surface 34, the depth differential between the shallow portion 40 and deep portion 42 is bridged by a descending or ascending shoulder 29 without any intervening screw flight or obstruction. Therefore, there is unimpeded flow from each geometrically shaped surface 34 onto the barrier land 35 and into the adjacent geometrically shaped surface 34 along the helical path of the screw S.

To make the geometrically shaped surfaces 34 in the otherwise cylindrical core 22, a 4-axis CNC thread grinding machine is preferably used. The grinding wheel width is less than the width of the helical valley 21. The width of the grinding wheel corresponds to the length of each geometrically shaped surface 34 relative to the width of the helical valley.

Using two single point diamonds the working face of the grinding wheel is contoured at an angle relative to the slope of each geometrically shaped surface 34. Using the contoured grinding wheel, all geometrically shaped surfaces 34 sloped in one direction are ground leaving adequate space inbetween. After grinding all of the geometrically shaped surfaces sloped in one direction, the grinding wheel is flipped 180° on the hub and the surfaces 34 sloped in the opposite direction are ground in the space therebetween.

Referring to FIG. 5, arrow 54 indicates the direction of flow imparted by helical flight 20 in the metering section 30, and arrow 43 indicates the helical path of the resin material which is forced along by helical flight 20. As molten material is extruded by the screw through the discharge opening 16, new material is added into the metering section from the transition section 28.

As the molten material advances in the metering section 30, the barrier land 35 and the alternate sloping geometrically shaped surfaces 34 cooperate to provide distributive and dispersive mixing. More specifically, the alternating slopes of the side-by-side geometrically shaped surfaces 34 cause a portion of the molten resin to experience a zig-zag mixing effect as the resin flows through the deep portions 42 of the geometrically shaped surfaces 34 as shown by mixing arrows 39. Further, molten resin passing from deep portions 42 to shallow portions 40 between adjacent shaped surfaces 34 experiences an increase in shear rate as the downstream velocity goes from slow to fast.

The progressively forward tumbling and mixing of the molten resin is enhanced as the resin comes within the path of each barrier land 35. While passing over the barrier land 35, the molten resin is compressed and massaged radially.

It will thus be seen that a new and useful screw, plasticating apparatus and method have been illustrated and described. It will be apparent to those skilled in the art that various changes or modifications may be made to the invention without departing from the spirit thereof.

Therefore, what is claimed is:

1. A plasticating apparatus comprising a rotating screw having a longitudinal axis and a core surface, said screw having a helical flight around said longitudinal axis forming a helical valley along a helical path, said helical flight being disposed within and cooperating with an inner wall of a heated barrel, said heated barrel having inlet and outlet openings, particles of resinous material being introduced through said inlet opening to the helical valley and advanced through the helical path towards said outlet opening, the helical valley being formed between said helical flight with the core surface of said screw forming a bottom of said helical valley, said screw having a metering section, the bottom of said helical valley in said metering section having a plurality of geometric shapes that were formed therein by a grinding machine having a grinding wheel, the geometric shapes being arranged side-by-side along said helical path with a barrier land separating each geometric shape from an immediately adjacent geometric shape, each barrier land traversing the helical valley, at least two shaped surfaces being sloped comparative to the longitudinal axis.

2. The plasticating apparatus of claim 1, wherein the geometric shapes are formed in the bottom of said helical valley in said metering section using the grinding machine having a grinding wheel with a working face, each geometric shape having a length substantially equal to the width of the working face of the grinding wheel.

3. The plasticating apparatus of claim 2, wherein the helical flight in the metering section has a substantially constant helical angle.

4. A screw for a plasticating apparatus, the plasticating apparatus having an inlet opening and an outlet opening, said screw comprising an axis, core surface and a metering section, the metering section having a helical flight defining a helical valley extending between said helical flight with the core surface being a bottom of said helical valley thereby forming a helical path directed towards said outlet opening, the helical flight in the metering section having a substantially constant helical angle, a plurality of geometric shapes in the core surface of said helical valley, each geometric shape having at least three sides with a top periphery, said geometric shapes being formed using a grinding machine, the geometric shapes being side-by-side along the helical path, between pairs of side-by-side geometric shapes there being a barrier land traversing the helical valley and intersecting the helical flight, at least two geometric shapes being sloped comparative to the screw axis, each sloped geometric shape having a deep portion and a shallow portion with a depth differential therebetween.

5. The screw of claim 4, wherein the top periphery of each geometric shape is formed in the bottom of said helical valley in said metering section using the grinding machine having a grinding wheel with a working face having a concave topography so that the top periphery of the geometric shapes formed by said grinding wheel are convex.

6. The screw of claim 4, wherein the top periphery of each geometric shape is formed in the bottom of said helical valley in said metering section using the grinding machine having a grinding wheel with a working face having a convex topography so that the top periphery of the geometric shapes formed by said grinding wheel are concave.

7. The screw of claim 4, wherein the top periphery of each geometric shape is formed in the bottom of said helical valley in said metering section using the grinding machine having a grinding wheel with a working face having an angled topography.

8. The screw of claim 4, wherein the depths of the shallow portions of the sloped geometric shapes being substantially equal.

9. The screw of claim 4, wherein the sloped geometric shapes being side-by-side and the depth of the shallow portion of each sloped geometric shape being at least equal to the depth of the barrier land therebetween.

10. A screw for a plasticating apparatus, the plasticating apparatus having a heated barrel with an inner wall, the screw comprising:
 a) an axis and a core surface;
 b) a metering section having a helical flight that cooperates with the inner wall of said heated barrel;
 c) a helical valley being formed between said helical flight with the core surface of the screw being the bottom of the helical valley, the helical valley forming a helical path;
 d) the core surface of said helical valley having a plurality of geometric shapes formed using a CNC grinding machine having a grinding wheel with a working face, said geometric shapes being side-by-side along the helical path, between adjacent geometric shapes there being a barrier land traversing the helical valley; and
 e) each of said geometric shapes being sloped comparative to the direction of the axis of the screw so that each geometrically shaped surface forms a depth differential in the helical valley relative to the inner wall of said barrel.

11. The screw of claim 10, wherein each sloped geometric shape has a deep portion and a shallow portion, the deep portion of each sloped geometric shape being adjacent to the shallow portion of the sloped geometric shape adjacent thereto along the helical path.

12. The screw of claim 11, wherein the depth of the shallow portion of each sloped geometric shape being substantially equal to the depth of the barrier land adjacent thereto.

13. The screw of claim 10, wherein the helical flight in the metering section has a substantially constant helical angle and at least one barrier land traversing the helical valley intersects the helical flight.

14. A process of plasticating resinous material in a molten state under pressure comprising:
 a) feeding solid resinous material to a screw rotating about an axis in a barrel, said barrel having a cylindrical inner surface, said screw having a helical flight with said helical flight cooperating with said inner surface to move said material along a helical path;
 b) heating said material while working the material between the barrel and the screw to convert a substantial portion of the solid material to a molten state;
 c) passing said material through a metering section having a helical valley defined by said helical flight and a bottom core, the helical flight in the metering section being continuous, the bottom core of said helical valley having a plurality of geometric shapes which were formed therein using a grinding machine, said geometric shapes being side-by-side along said helical path in an alternating pattern, the side-by-side geometric shapes being sloped with each having a shallow portion and deep portion relative to the inner surface of the barrel, between the shallow and deep portions of each geometric shape there being a constant sloping depth differential;
 d) between the side-by-side geometric shapes there being a barrier land traversing the helical valley; and
 e) said heated material in the metering section is continuously advanced by the helical flight toward an outlet port, said heated material being advanced mixes by passing over said geometric shapes and barrier lands.

15. The process of claim 14, wherein the deep portion of each sloped geometric shape being adjacent to the shallow portion of the sloped geometric shape immediately adjacent thereto along the helical path, so that said heated material in the metering section being advanced by the helical flight moves in a zig-zag direction relative to the helical path.

16. The process of claim 14, wherein the geometric shapes are formed in the bottom of said helical valley in said metering section using the grinding machine having a grinding wheel with a working face having an angled topography.

17. The process of claim 14, wherein the geometric shapes are formed in the bottom of said helical valley in said metering section using the grinding machine having a grinding wheel with a working face, and each geometric shape having a length equal to the width of the grinding wheel.

* * * * *